W. LIEDKE.
PROCESS FOR PRODUCING COMPRESSED AIR OR COMPRESSED GAS ESPECIALLY FOR THE OPERATING OF LAMPS.
APPLICATION FILED MAY 19, 1911.
1,095,897.                               Patented May 5, 1914.
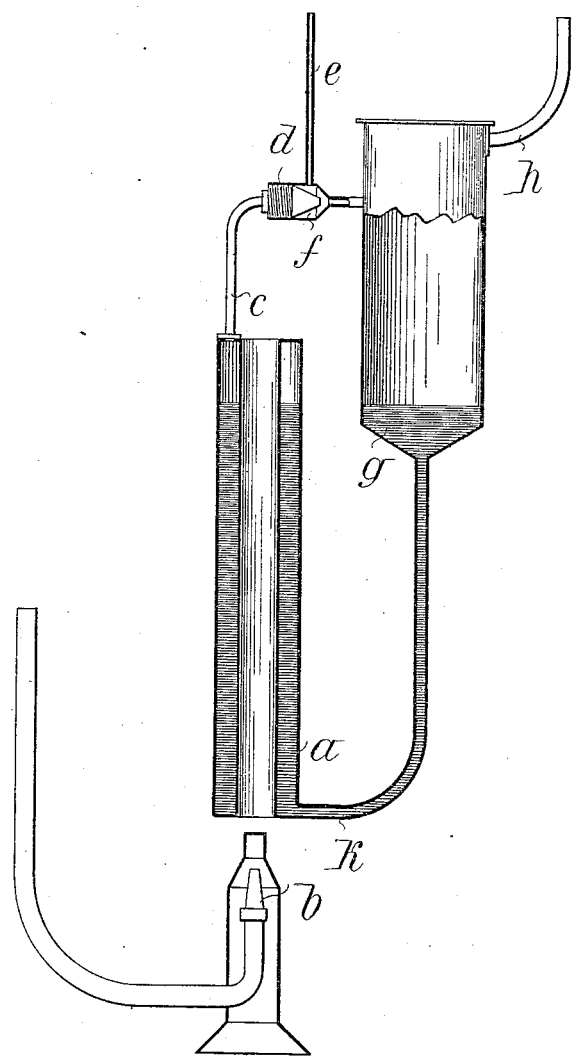
WITNESSES
J. P. Davis
INVENTOR
Willibald Liedke
BY Munn & Co.
ATTORNEYS

UNITED STATES PATENT OFFICE.

WILLIBALD LIEDKE, OF BERLIN, GERMANY.

PROCESS FOR PRODUCING COMPRESSED AIR OR COMPRESSED GAS ESPECIALLY FOR THE OPERATING OF LAMPS.

1,095,897.   Specification of Letters Patent.   Patented May 5, 1914.

Application filed May 19, 1911. Serial No. 628,166.

*To all whom it may concern:*

Be it known that I, WILLIBALD LIEDKE, a subject of the Emperor of Germany, residing at No. 17 Grolemannstrasse, in the city of Berlin-Charlottenburg, Empire of Germany, have invented a certain new and useful Process for Producing Compressed Air or Compressed Gas Especially for the Operating of Lamps, of which the following is a specification.

Apparatuses are already known for the production of compressed air or gas especially for the purpose of actuating lamps in which compressed air or gas is produced by causing a vaporizable or volatile fluid to move in a circular course in such a manner that the vaporized or evaporated fluid on its outflow under pressure from the vaporizing or volatilizing apparatus, compresses the current of air or gas and is itself condensed and returned to the volatilizing vessel. The apparatuses hitherto in use have, however the drawback that in consequence of the choice of the material to be evaporated or volatilized, the apparatuses must be constructed of great size without attaining the necessary fluid pressure, and nevertheless the pressure actually obtained was only a small one.

The present invention consists essentially in the application of quicksilver as the volatilizing material.

In the accompanying drawing an apparatus is illustrated diagrammatically which serves for the carrying out of the process according to the present invention.

In a receptacle $a$ quicksilver is placed. The vessel can be heated by means of a suitable burner $b$ placed underneath it. The quicksilver vapor which is developed, is conducted through a pipe $c$ to a nozzle $d$. A pipe $e$ supplies gas or air to a mixing tube $f$. The quicksilver vapors flowing through the nozzle $d$ under pressure will compress the air or the gas supplied through the pipe $e$ in the receptacle $g$ and the air thus brought under pressure passes through a pipe $h$ to the place of consumption. The quicksilver vapors condense, collect at the bottom of the receptacle, and are again delivered to the receptacle $a$ through a pipe $k$. By the application of quicksilver as the evaporating fluid it is possible in consequence of the weight of the quicksilver to make the pipe $h$ quite short and the receptacle $a$ very small, whereby in contradistinction to all other gas or volatile liquids, the air or the gas in the container $g$ is brought under a high pressure. Moreover the air condensation and the property of the quicksilver to be absorbed by air only in very trifling quantities, make this material specially well adapted for the present process as compared with all other possible materials.

What I claim is:

1. The method herein described of compressing air or gas for feeding a lamp, consisting in vaporizing quicksilver, ejecting the vaporized quicksilver into a body of air or gas to force the latter along with the vapor into a reservoir to compress the same therein, and conducting the compressed air or gas direct to the lamp.

2. The method herein described of compressing air or gas for feeding a lamp, consisting in vaporizing quicksilver in a small receptacle, ejecting the vaporized quicksilver into a body of air or gas to force the latter along with the vapor into an unobstructed reservoir, whereby the air or gas will be compressed in the reservoir and the quicksilver vapor condensed therein, conducting the compressed air or gas from the reservoir direct to the lamp, and conducting the condensed quicksilver to the vaporizing receptacle.

In testimony whereof I have signed my signature to this specification in presence of two witnesses.

WILLIBALD LIEDKE.

Witnesses:
 WOLDEMAR HAUPT,
 HENRY HASPER.

Copies of this patent may be obtained for five cents each, by addressing the "Commissioner of Patents, Washington, D. C."